3,700,467
MUSHROOM PUFFS
Thomas Di Cecco, Toughkenamon, Pa.
(P.O. Box 370, Avondale, Pa. 19311)
Filed Sept. 9, 1970, Ser. No. 70,767
Int. Cl. A23b 7/02
U.S. Cl. 99—104                     7 Claims

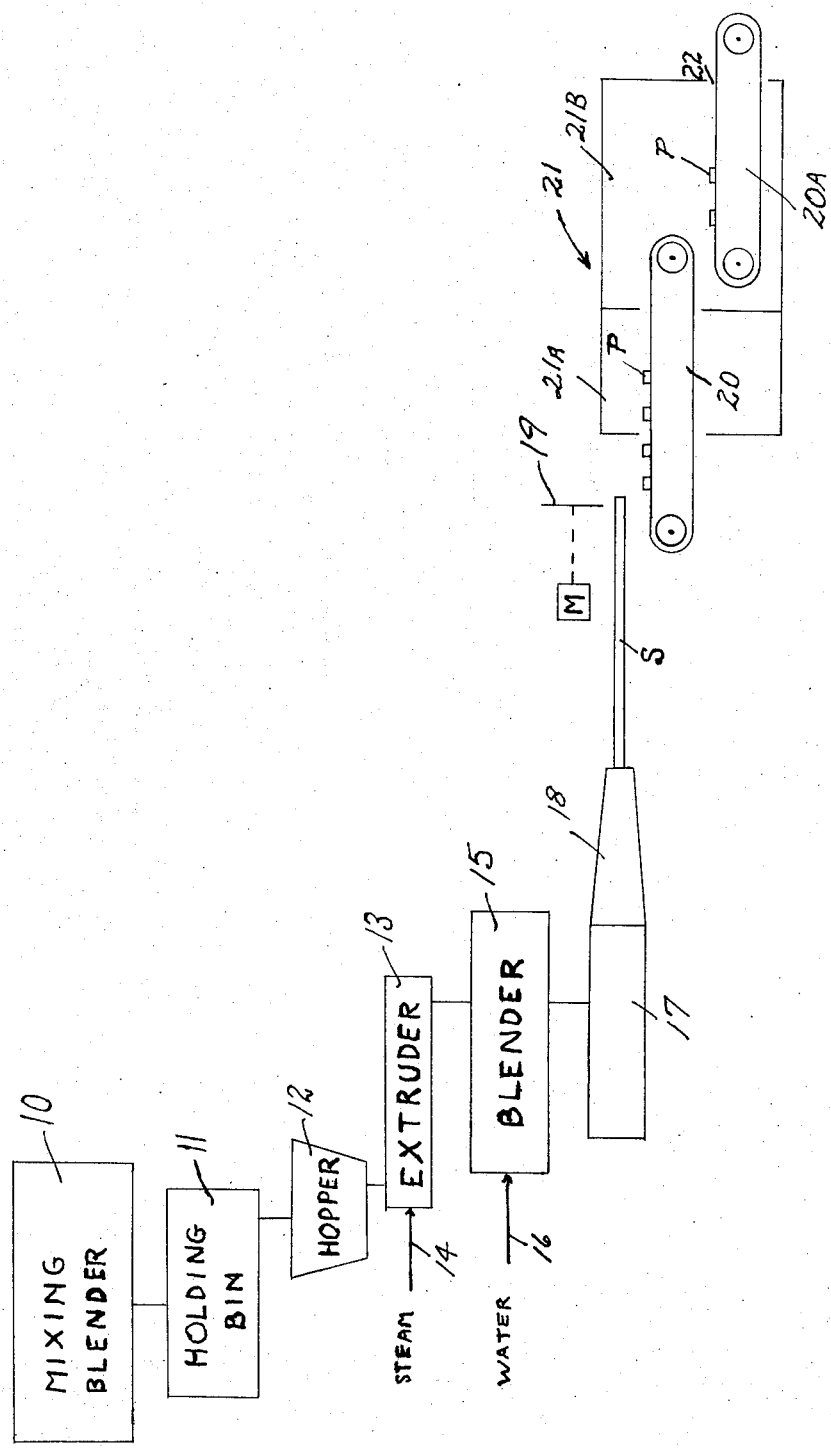

ABSTRACT OF THE DISCLOSURE

An edible mushroom product having a puffed structure, a relatively high protein content; free of cholesterol and having a unique and exotic flavor. The product is produced by comminuting mushrooms, mixing the same with flour, and, by a process of steaming, water spraying, cooking, extruding through a suitable die, and cutting into desired lengths, is formed into short sticks or biscuits.

BACKGROUND OF THE INVENTION

Edible puffs are well known in the art. Such puffs are derived from various flour compositions, with added flavoring elements. Further, the puffs are generally fried or heated in oils or fats. It follows that such known puff products comprise essentially a flour base matrix and added flavoring elements distributed through the matrix, such as nuts, fruits, vegetables, spices, meat, cheese, fish, poultry, and the like. Further, such products may have an oily character and in any event, exhibit a substantial cholesterol content.

Accordingly, an object of this invention is to provide an improved edible puff which includes a major proportion of mushrooms, to thereby give the product a unique and exotic flavor.

Another object of this invention is to provide a puff product of the character described, which is not fried or heated in oil or fat to produce a puff structure, and therefore is altogether free of any oil or fat content and therefore without cholesterol content.

Still another object of this invention is to provide an improved method of making edible puffed product having a mushroom base, wherein a mushroom containing dough is pressure cooked and flashed to produce a puffed structure without adversely affecting the unique flavor imparted to the product by the mushroom content thereof.

Other objects of this invention will in part be obvious and in part hereinafter pointed out.

DESCRIPTION OF THE DRAWING

The single figure is a schematic showing of the process for forming mushroom puffs embodying the invention, all the equipment employed being conventional and commercially available as will be apparent to those skilled in the art.

DESCRIPTION OF THE PREFERRED EMBODIMENT

Essentially, the food product embodying the instant invention comprises a mixture of mushrooms and flour, which is processed in a manner to convert the same to a puff structure, wherein the unique taste of the mushrooms is imparted thereto.

Further, the basic mixture of mushrooms and flour is initially preconditioned with steam, then sprayed with water to raise the water content to a determined level, cooked and extruded to form a compacted dough and then flash extruded in stick form having a pufflike structure.

The pufflike stick is then cut into short lengths, and toasted and dried to reduce the water content to a determined level. The product is then cooled and packaged.

Thus, the puffs embodying the invention are derived from a mixture of ingredients as follows:

|  | Percent |
| --- | --- |
| Mushrooms | 54 |
| Wheat flour | 44 |
| Salt | 1.35 |
| Monosodium glutamate | 0.6 |
| Calcium propionate | 0.05 | all by weight.

The mushrooms may be fresh, dehydrated, or of the quick dry freeze type. In all cases, the mushrooms are suitably comminuted in finely divided form.

The foregoing ingredients are fed to a large mixing blender 10 to form a premix. Such premix is passed to a holding bin 11 which for example may have 1,000 lb. capacity.

As needed, the premix is fed from the bin 11 to a hopper 12 of a stainless steel cooker extruder 13. Here the dry mix is steam preconditioned at a temperature of about 210° F. by steam admitted by way of line 14. Auger means, not shown, advances the steamed mix to the outlet of the extruder 13, where the same passes to a paddle type blender 15.

Here the steam moistened mix is subjected to a combined water spraying and mixing action to raise the water content of the mix to about 26%; the water being admitted by way of line 16.

The resultant mix is then passed to a housed auger assembly 17 where the mix is converted to a compacted dough in a time interval of about 5 seconds at a temperature of about 250° F. The dough is then pressure cooked for 8–12 seconds at about 300° F. in the tapered extrusion section 18 of the assembly 17 and flashed through a suitable die at the forward end of section 18, being thereby converted to an expanded, continuous stick S having a pufflike structure.

The water content of the finished stick S will be thus reduced to about 21% and its density expanded to about 3 lbs./cu. ft. A rotary, variable speed knife 19 driven by a 3 H.P. motor M finally cuts the stick S to a suitable puff length which may be of the order of 1" or more.

The resultant puffs P travel on a conveyor 20 into a combination dryer-toaster and cooler 21. Conveyor 20 comprises a 10 x 35 foot perforated stainless steel endless belt located in section 21A and projecting into section 21B. In section 21A the puffs P are dried to a moisture content of 0.32 gram per ounce by air at 280° to 320° F. circulating at a rate of 150–175 ft./minute. The dried puffs P then pass to a conveyor 20A, similar to conveyor 20, in cooling section 21B, where the puffs P are subjected to filtered ambient air at the same rate of circulation. Finally, the dried, cooled puffs P pass by way of outlet 22 to a bin, not shown, which feeds packaging or bagging machines, not shown.

It has been found that the mushroom content of the basic mixture may range from about 50 to about 60% by weight and the flour may range from about 40 to about 50% by weight; the resultant puffs P showing a distinct, unique and exotic flavor in all cases. The calcium propionate acts as a preservative in the usual manner; the salt and glutamate providing the usual taste modifications of the basic flavor.

An analysis of the puffs P shows a moisture content by weight of 1.11%; a protein content of 13.79%; a fat content of 0.04%; a carbonhydrate content of 80.89%; a calcium content of 0.11% and a phosphorus content of 0.53%. The product is altogether free of cholesterol.

It will be appreciated that the unique mushroom flavor remains unimpaired by the processing of the initial mix to final product as set forth above. Further, as frying or cooking the end product in oil or fat is unnecessary the product altogether free of an oily or fatty deposit and an oily taste.

What is claimed is:

1. A process for producing a puffed mushroom product comprising preparing a dry mixture including by weight about 50–60% mushrooms and about 40–50% flour, blending the mix while adding water to raise the water content of the mix about 26%, extruding the mix to form a compacted dough, pressure cooking the dough, flashing the cooked dough to form an expanded, puffed structure, and drying the puffed structure to reduce the moisture content thereof.

2. A process as in claim 1 wherein the dry mix, prior to said blending, is preconditioned with steam at a temperature of about 210° F., and further wherein said compacting of the dough is effected at a temperature of about 250° F., and said pressure cooking is effected at a temperature of about 300° F.

3. A process as in claim 2, wherein the dough is both extruded and compacted for about 5 seconds.

4. A process as in claim 3, wherein the dough is pressure cooked for about 8–12 seconds.

5. A process as in claim 1, wherein as the final step the puffed structure is dried to a moisture content of about 20% and a density of about 3 lbs. per cubic foot.

6. A puffed mushroom product comprising by weight about 50–60% mushrooms and about 40–50% flour, said product having a density of about 3 lbs./cu. ft.

7. A puffed mushroom product according to claim 6, and wherein the proportion of mushrooms is about 54%, the proportion of flour is about 44%, and further including about 1.35% salt, about 0.6% monosodium glutamate, and about 0.05% calcium propionate.

References Cited
UNITED STATES PATENTS

| | | | |
|---|---|---|---|
| 3,407,070 | 10/1968 | Murray et al. | 99—100 X |
| 3,259,503 | 7/1966 | Tan et al. | 99—100 X |
| 2,278,469 | 4/1942 | Musher | 99—82 X |

HOWARD R. CAINE, Primary Examiner

U.S. Cl. X.R.

99—82